(12) United States Patent
Kopmanis

(10) Patent No.: US 10,816,414 B2
(45) Date of Patent: Oct. 27, 2020

(54) METHODS OF NON-DESTRUCTIVE RESIDUAL STRESS MEASUREMENT USING BARKHAUSEN NOISE AND USE OF SUCH METHODS

(71) Applicant: Ford Motor Company, Dearborn, MI (US)

(72) Inventor: Michael A. Kopmanis, Monroe, MI (US)

(73) Assignee: Ford Motor Company, Dearborn, MI (US)

( * ) Notice: Subject to any disclaimer, the term of this patent is extended or adjusted under 35 U.S.C. 154(b) by 56 days.

(21) Appl. No.: 16/157,849

(22) Filed: Oct. 11, 2018

(65) Prior Publication Data

US 2020/0116576 A1   Apr. 16, 2020

(51) Int. Cl.
   *G01L 1/12*   (2006.01)
(52) U.S. Cl.
   CPC ....................... *G01L 1/12* (2013.01)
(58) Field of Classification Search
   None
   See application file for complete search history.

(56) References Cited

U.S. PATENT DOCUMENTS 7,159,470 B2 * 1/2007 Saguto ................... G01N 3/068
                                                          73/779
9,957,584 B2    5/2018 Campbell et al.

FOREIGN PATENT DOCUMENTS

| DE | 2837733 | 6/1984 |
| EP | 0683393 | 10/1997 |
| JP | H05264508 | 10/1993 |

OTHER PUBLICATIONS

Deveci, Murat, Non-Destructive Determination of Case Depth by Barkhausen Noise Method, Master of Science Thesis, Master's Degree Programme in Materials Engineering, Tampere University of Technology, May 2016, available at URL https://dspace.cc.tut.fi/dpub/bitstream/handle/123456789/24049/deveci.pdf.

* cited by examiner

*Primary Examiner* — Jas A Sanghera
(74) *Attorney, Agent, or Firm* — Burris Law, PLLC

(57) ABSTRACT

A method for determining residual stress in a selectively hardened parts including an unhardened region adjacent to a hardened region is provided. The method includes obtaining a Barkhausen Noise (BN) value for the unhardened region and selecting a corresponding absolute residual stress value from a look-up table. The selected absolute residual stress value accurately estimates the absolute residual stress in the hardened region of the selectively hardened part. In variations of the method the unhardened region is surrounded by the hardened region, the hardened region is a laser hardened region and the unhardened region is not laser hardened.

20 Claims, 5 Drawing Sheets

Figure 2A:
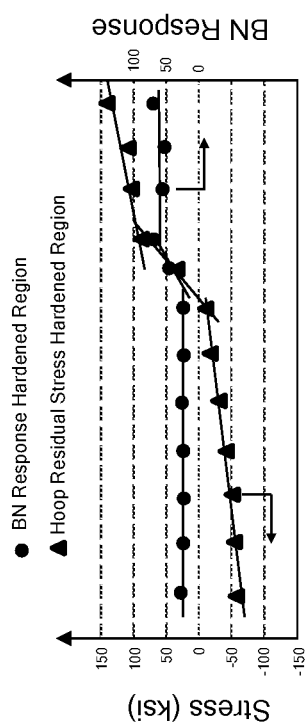

METHODS OF NON-DESTRUCTIVE RESIDUAL STRESS MEASUREMENT USING BARKHAUSEN NOISE AND USE OF SUCH METHODS

FIELD

The present disclosure relates to non-destructive evaluation (NDE) of metallic parts, and particularly to NDE of metallic parts using Barkhausen Noise.

BACKGROUND

The statements in this section merely provide background information related to the present disclosure and may not constitute prior art.

The measurement of stress at or near a surface of a metallic part (also known as "residual stress") may be important to determine if the surface region is in a compressive stress state, a tensile stress state, or a neutral stress state. For example, a metallic surface under compressive stress is known to have enhanced fatigue and/or galling resistance compared to a similar surface under tensile stress. As such, surfaces of metallic parts may be heat treated (e.g., heated to an elevated temperature and cooled) in order to put the surfaces in a compressive state.

The absolute residual stress at and near the surface of a metallic part is typically measured using an x-ray diffraction (XRD) technique. Particularly, the part must be sectioned, a surface is scanned via XRD, chemically etched to remove a prescribed depth, scanned again via XRD, etched again, scanned again via XRD, etc., until a series of XRD scans as a function of depth within the surface of the metallic part are obtained. Also, the absolute residual stress, both hoop and axial, at each depth can be calculated from the series of XRD scans. However, the XRD scanning technique is time consuming, expensive, and destructive to the metallic part (i.e., it is a destructive measurement technique).

Barkhausen Noise (BN), derived from the "Barkhausen effect", is one technique that has been investigated for non-destructive measurement of residual stress in surface regions of metallic parts. The BN technique is based on or results from "noise" that occurs when a magnetic field within a ferromagnetic material changes, i.e., when the magnetic field moves within the ferromagnetic material. While the BN technique does not provide measurements of absolute residual stress, the quantity or magnitude of the BN is related to material inhomogeneities (e.g. impurities, crystal dislocations, voids) and the residual stress within the measured region. Accordingly, attempts have been made to correlate BN readings with absolute residual stress values obtained with the XRD scanning technique. However, BN is relatively insensitive to compressive residual stress and has only been useful for determining when a surface region changes from a compressive stress state to a neutral stress state or tensile stress state.

The present disclosure addresses the issues of detecting, measuring, and quantifying compressive residual stress in materials using BN technology.

SUMMARY

In one form of the present disclosure, a method for determining residual stress in a selectively hardened part comprising an unhardened region adjacent to a hardened region is provided. The method comprises obtaining a Barkhausen Noise (BN) response for the unhardened region and selecting an X-ray diffraction (XRD) residual stress value as a function of the BN response from a look-up table. Also, the selected XRD residual stress value accurately estimates the residual stress in the hardened region of the selectively hardened part.

In some aspects of the present disclosure, the unhardened region is at least partially surrounded by the hardened region. The hardened region may be a laser hardened region, the unhardened region may not be laser hardened and the selectively hardened part may be a crankshaft, a camshaft, or a gear. However, the method for determining residual stress in accordance with the teachings of the present disclosure may be used on any part with an unhardened region surrounded by a hardened. In one aspect of the present disclosure, the selectively hardened part is a crankshaft formed from a steel alloy, the hardened region is a pin journal surface of the crankshaft, and the unhardened region is a pin oil hole. The pin journal surface may be laser hardened except for the region surrounding the pin oil hole, and the laser hardened pin journal surface may comprise a martensitic microstructure and the unhardened region surrounding the pin oil hole may comprise a ferritic microstructure.

In some aspects of the present disclosure, the laser hardened region is in a first stress state and the unhardened region is in a second stress state that is more positive than the first stress state. For example, the laser hardened region may be in a compressive stress state and the unhardened region may be in a neutral stress state and/or a tensile stress state. Also, the laser hardened region may have a first hardness and the unhardened region may have a second hardness that is less than the first hardness.

The look-up table may include a plurality of XRD residual stress values for a plurality of hardened regions within a plurality of selectively hardened parts, and a plurality of BN responses for a plurality of unhardened regions within the plurality of selectively hardened parts. In some aspects of the present disclosure, the plurality of XRD residual stress values and the plurality of BN responses of each generally obey a linear relationship. In one aspect of the present disclosure, the plurality of XRD residual stress values obeys a first linear relationship and the plurality of BN responses obeys a second linear relationship that is different than the first linear relationship.

In another form of the present disclosure, a method of determining residual stress of a hardened region in a selectively hardened part includes creating a look-up table comprising XRD residual stress values and BN responses from a plurality of selectively hardened parts. The XRD residual stress values include XRD residual stress measurements from a plurality of hardened regions of the plurality of selectively hardened parts with a range of residual stresses. The BN responses include BN readings from a plurality of unhardened regions of the plurality of selectively hardened parts with a range of residual stresses. The unhardened region of each of the plurality of selectively hardened parts is adjacent to the hardened region such that a residual stress of the unhardened region is a function of a residual stress of the hardened region. The method also includes scanning an unhardened region of a selectively hardened part with a BN scanner, obtaining a BN response, and selecting an XRD residual stress value from the look-up table corresponding to the BN response. The selected XRD residual stress value accurately estimates the residual stress in the hardened region of the selectively hardened part thereby providing a non-destructive evaluation of the residual stress in the hardened region.

In yet another form of the present disclosure, a system for measuring residual stress is provided. The system includes a BN scanning system configured to scan an unhardened region of a selectively hardened part and obtain a BN response for the unhardened region. A look-up table may be included in the system and the look-up table may comprise a plurality of XRD residual stress values for a plurality of hardened regions from a plurality of selectively hardened parts and a plurality of BN responses for a plurality of unhardened regions from the plurality of selectively hardened parts. The plurality of XRD residual stress values may include a progression of linearly increasing residual stress values and the plurality of BN response may include a progression of linearly increasing BN responses. The unhardened region of each of the plurality of selectively hardened parts may be adjacent to the hardened region of each of the plurality of selectively hardened parts such that a residual stress of the unhardened region is a function of a residual stress of the hardened region. The system may include a microprocessor configured to receive a BN response for an unhardened region of the selectively hardened part from the BN scanning system and select an XRD residual stress value from the look-up table as a function of the BN response. The selected XRD residual stress value accurately estimates a residual stress of a hardened region of the selectively hardened part.

Further areas of applicability will become apparent from the description provided herein. It should be understood that the description and specific examples are intended for purposes of illustration only and are not intended to limit the scope of the present disclosure.

DRAWINGS

Figure 2B:
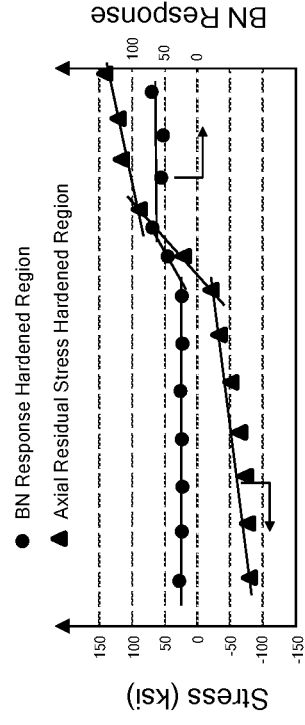
Figure 1:
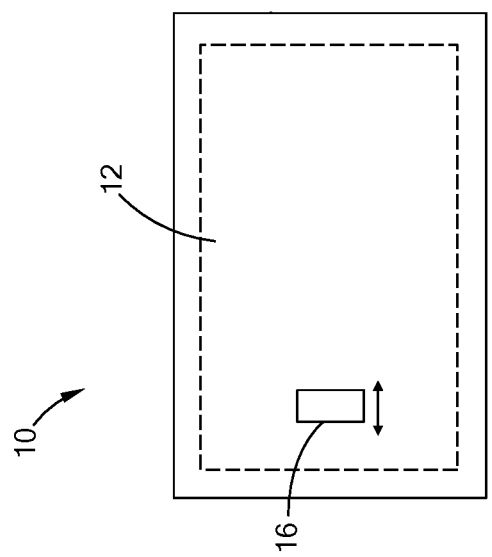
Figure 4A:
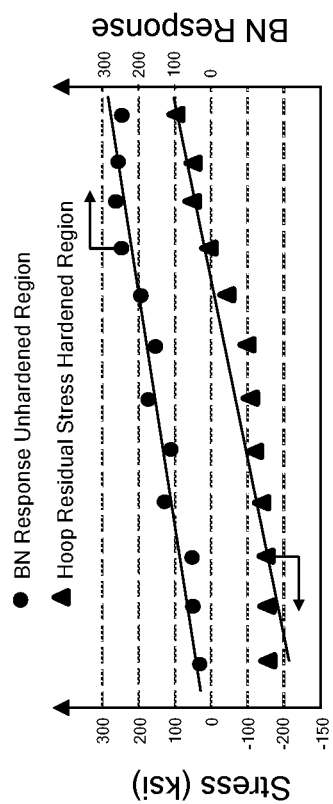
Figure 4B:
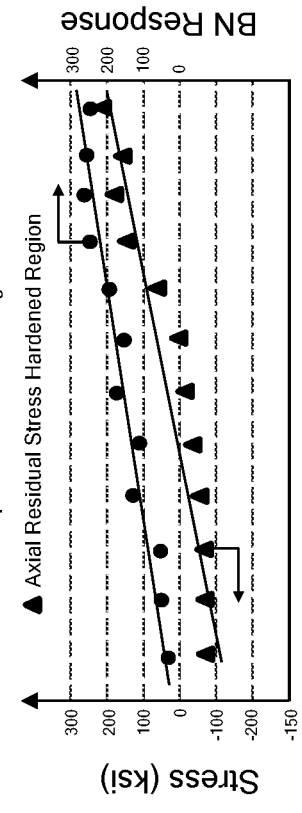
Figure 3:
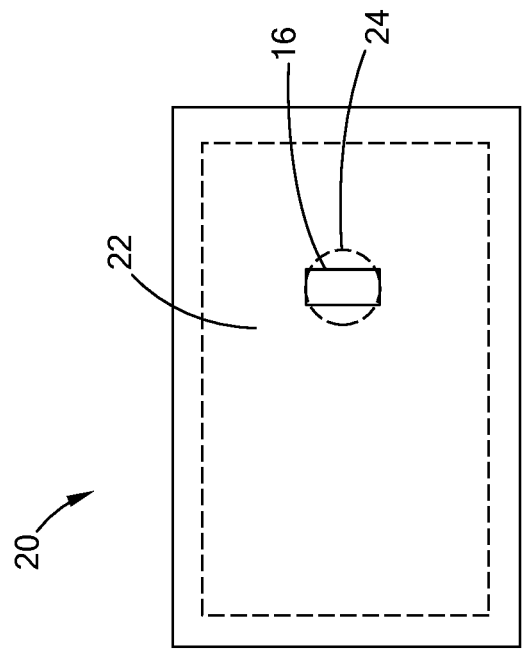
Figure 5A:
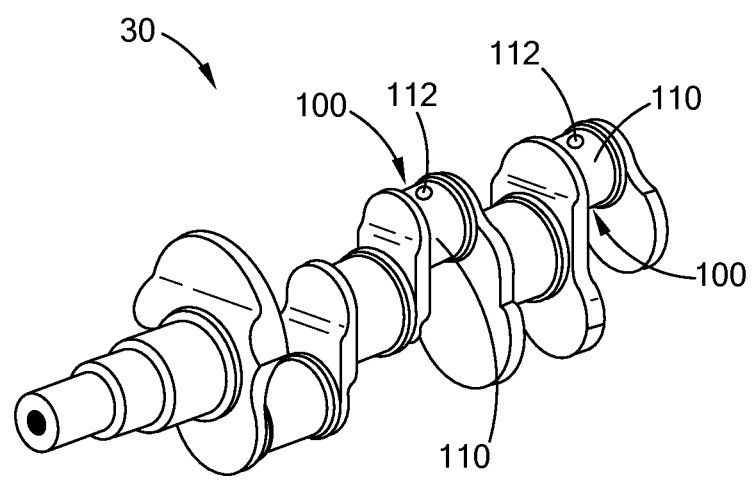
Figure 5B:
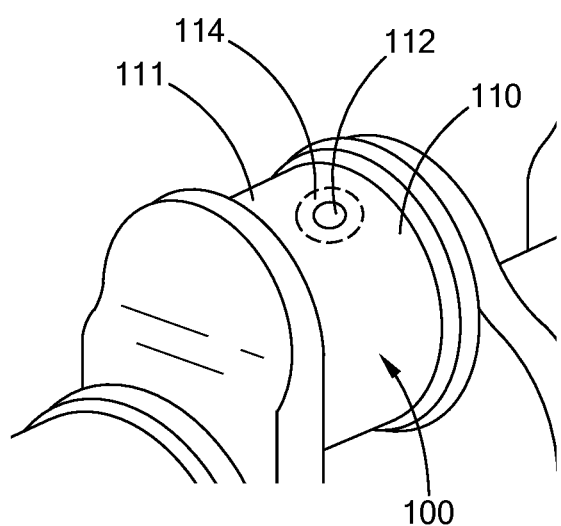
Figure 7:
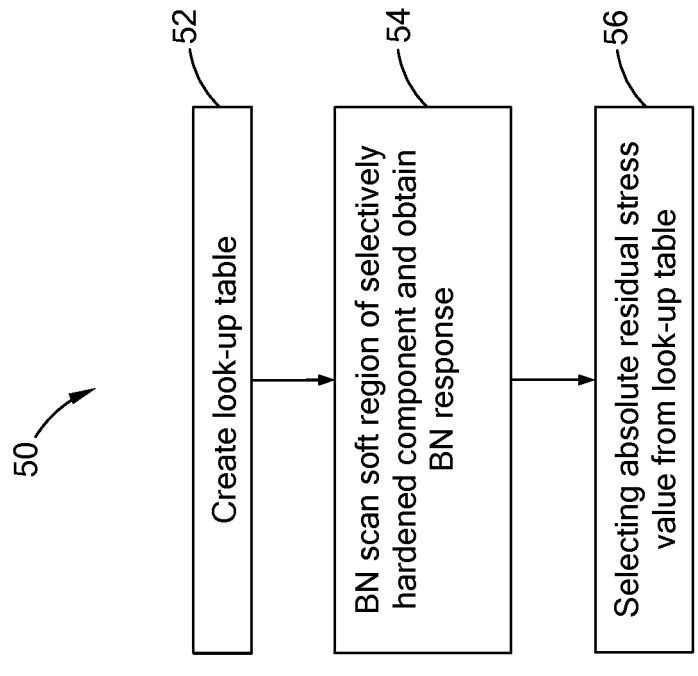
Figure 6:
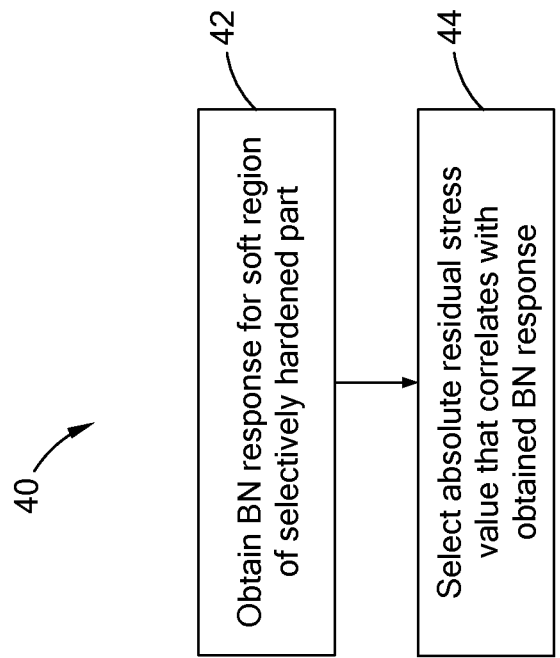
Figure 8:
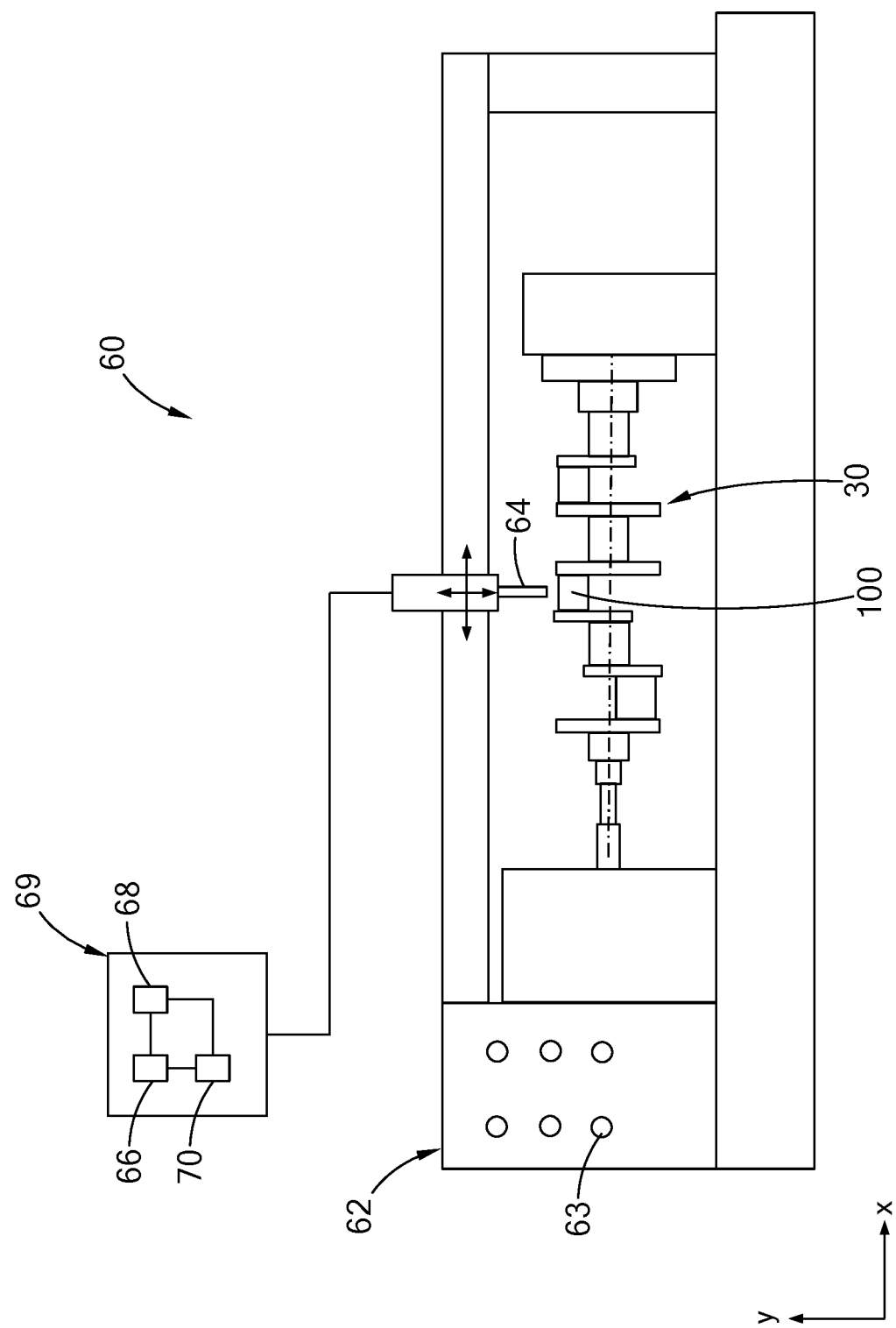

In order that the disclosure may be well understood, there will now be described various forms thereof, given by way of example, reference being made to the accompanying drawings, in which:

FIG. 1 schematically depicts a selectively hardened part with a hardened region being scanned with a Barkhausen Noise (BN) scanner;

FIGS. 2A and 2B graphically depict an X-ray diffraction (XRD) residual stress and BN response analysis of the part in FIG. 1;

FIG. 3 schematically depicts a selectively hardened part an unhardened region being scanned with a BN scanner;

FIGS. 4A and 4B graphically depict an XRD residual stress and BN response analysis of the part in FIG. 3 according to the teachings of the present disclosure;

FIG. 5A schematically depicts a crankshaft with an oil hole in a pin of the crankshaft;

FIG. 5B schematically depicts an enlarged view of the oil hole in FIG. 5A;

FIG. 6 schematically depicts a method of determining residual stress in a selectively hardened part comprising an unhardened region adjacent to a hardened region according to the teachings of the present disclosure;

FIG. 7 schematically depicts a method of determining residual stress of a hardened region in a selectively hardened part according to the teachings of the present disclosure; and FIG. 8 schematically depicts a residual stress measurement system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a hardened part 10 with a hardened region 12 is schematically depicted. A BN scanner 16 is configured to scan and obtain a BN response (also referred to herein as "BN reading" and "BN value") from the hardened region 12.

Referring now to FIGS. 2A and 2B, a graphical depiction of absolute hoop and axial residual stress values (also referred to herein simply as "hoop residual stress", "axial residual stress" and "residual stress"), respectively, and corresponding BN responses, is shown. Particularly, FIG. 2A provides a comparison of absolute hoop residual stress obtained via XRD at uniform relevant depths and BN response for exactly the same hardened part 10 over a range of residual stresses between about −65 ksi to about +136 ksi. Similarly, FIG. 2B provides a comparison of absolute axial residual stress obtained via XRD at uniform relevant depths and BN for exactly the same hardened part 10 over a range of residual stresses between about −80 ksi to about +130 ksi. As shown in FIGS. 2A and 2B, the BN response has a generally zero slope and is non-linear relative to the XRD residual stress values and thereby does not correlate with the absolute residual stress. Accordingly, a correlation between BN response and residual stress is not available, particularly since the BN response for compressive residual stress (e.g., values between 0 ksi and −60 ksi in FIG. 2A) does not change. A step function in BN response occurs once a tensile stress condition is recognized, but again, the relationship remains non-linear to XRD residual stress. FIGS. 2A and 2B illustrate the traditional challenge faced when trying to utilize BN as a non-destructive means to determine residual stress.

It should be understood that the XRD residual stress values graphically depicted in FIGS. 2A and 2B require a significant amount of time (e.g., hours) to obtain and the XRD technique is not practical for measuring residual stress on a production parts, particularly production parts produced in large quantities. Accordingly, earlier studies have attempted to compare BN responses from hardened regions with XRD residual stress standards developed for the hardened regions. However, given the lack of correlation noted above between BN responses and compressive residual stress values such comparisons have not provided suitable non-destructive measurement of residual stress using BN.

Referring now to FIGS. 3, 4A and 4B, a selectively hardened part 20 is schematically depicted in FIG. 3 and look-up tables according to the teachings of the present disclosure are graphically depicted in FIGS. 4A and 4B. The selectively hardened part 20 comprises a hardened region 22 and an unhardened region 24 adjacent to the hardened region 22. As used herein, the phrase "unhardened region" refers to a region of a part that has not been hardened during hardening of a hardened region of the part and is in a tensile stress state, a neutral stress state or a combination of a tensile stress state and a neutral stress state (i.e., a residual stress generally equal to or greater than 0 ksi). In some aspects of the present disclosure, the hardened region 22 of the selectively hardened part 20 is laser hardened (i.e., the hardened region 22 is a laser hardened region 22) and the unhardened region 24 is not laser hardened. The unhardened region 24 may at least partially surrounded or enclosed within the hardened region 22 and the residual stress within the unhardened region 24 is a function of the residual stress in the adjacent hardened region 22. Particularly, and assuming the unhardened region comprises a tensile residual stress, the greater the compressive residual stress in the adjacent hardened region 22, the lower (i.e., less positive) the tensile residual stress in the unhardened region 24. As used herein the phrase "more positive" refers to a residual stress that is greater than another residual stress (e.g., a residual stress of −5 ksi is more positive than a residual stress of −10 ksi, and a residual stress of +10 ksi is more positive than a residual stress of +5 ksi). Also, the phrase "less positive" as used herein refers to a residual stress that is less than another residual stress (e.g., a residual stress of −10 ksi is less positive than a residual stress of −5 ksi, and a residual stress of +5 ksi is less positive than a residual stress of +10 ksi).

Referring specifically to FIG. 4A, a plurality of hoop residual stress values obtained via XRD at uniform depths for a plurality of hardened regions 22 is graphically depicted. The plurality of hoop residual stress values range from about −180 ksi to about +100 ksi. FIG. 4B graphically depicts a plurality of axial residual stress values obtained via XRD at uniform depths for the plurality of hardened regions 22. The plurality of axial residual stress values range from about −90 ksi to about +200 ksi. FIGS. 4A and 4B also graphically depict a plurality of BN responses for the plurality of unhardened regions 24 positioned adjacent to the plurality of hardened regions 22 for which the XRD hoop and axial residual stress values were measured. The plurality of BN responses in FIGS. 4A and 4B provide a progression from about 20 to about 250. Accordingly, FIGS. 4A and 4B represent BN responses when monitoring the unhardened region 24 relative to XRD stress of the surrounding hardened region 22. FIGS. 4A and 4B illustrate the value in the proposed alternative approach as residual stress can be evaluated with correlation over both compressive and tensile stresses. The value of such a method is recognized as proactive monitoring of stress can be performed without destructive testing.

As shown in FIGS. 4A and 4B, the progression of residual stress values and BN responses each generally follow or obey a linear relationship. Accordingly, the BN responses for the plurality of unhardened regions 24 may be correlated with the progression of hoop residual stress and axial residual stress measured from the plurality of hardened regions 22. That is, an unhardened region 24 positioned adjacent a hardened region 22 a BN response that is proportional to the residual stress of the adjacent hardened region 22 and the residual stress of the hardened region 22 may be determined from the BN response from the unhardened region 24. That is, the BN response of the unhardened region 24 is more sensitive to report change and correlate with stress changes in the surrounding hardened region 22 since the unhardened region 24 is not under compressive stress. Accordingly, a residual stress value may be selected as a function of a BN response obtained from an unhardened region 22 (e.g., selecting a residual stress value in FIG. 4A or 4B on the same vertical axis as the BN response) and the selected residual stress value accurately estimates the actual residual stress in a hardened region 22 that is adjacent the unhardened region 24. As used herein, the phrase "accurately estimated" or "accurately estimates" refers to a selected residual stress value from a look-up table within at least +/−30% of an absolute value measure via XRD. In some aspects of the present disclosure, a selected residual stress value is within at least +/−20%, e.g., within at least +/−10% of an absolute value measure via XRD. As used herein, the phrase "look-up table" refers to a table, graph, equation, etc., that provides a residual stress value for a given BN response.

Referring now to FIGS. 5A and 5B, a crankshaft 30 with a selectively hardened pin 100 is schematically depicted. The selectively hardened pin 100 may include a pin journal face 110 and a pin oil hole 112. The pin journal face 110 may comprise a hardened region 111 and an unhardened region 114 adjacent the hardened region 111 and surrounding the oil hole 112. In some aspects of the present disclosure, the pin journal face 110 may be selectively hardened using laser hardening. That is, laser hardening may be used to heat the pin journal surface 110, except for the unhardened region 114 surrounding the pin oil hole 112, followed by cooling of the pin journal surface 110.

It should be understood that laser hardening, and other selectively hardening techniques disclosed herein, increase the temperature of the surface region to within a desired temperature range followed by cooling the surface region such that the surface region is placed in a compressive stress state. However, the unhardened region 114, having not been heat treated, remains in a neutral state. While laser hardening provides enhanced temperature and spatial control for the heat treatment of the journal surface 110, and other surfaces and parts disclosed herein, it should be understood that other heat treating techniques may be used with the method taught in the present disclosure. Non-limiting heat treating techniques include induction heating, flame heating, gas or ion nitriding and the like.

In some aspects of the present disclosure, heat treating the hardened region 111, and other hardened regions described herein, results in a phase transformation of the surface region. For example, the selectively hardened pin 100 may be formed from a steel alloy, and heat treating the pin journal face 110 may result in the hardened region 111 having a martensitic microstructure. Also, the unhardened region 114, having not been heated treated similarly as the pin journal face 110, may have a ferritic microstructure. As used herein, the phrase "martensitic microstructure" refers to a microstructure comprising at least 80 volume percent (vol. %) martensite, for example at least 90 vol. % martensite, with bainite and retained austenite possibly present. Also, the phrase "ferritic microstructure" refers to a microstructure comprising ferrite and possibly pearlite with less than 10 vol. % martensite and/or bainite, for example less than 5% or less than bainite.

Still referring to FIGS. 5A and 5B, in some aspects of the present disclosure the method includes obtaining XRD hoop and/or axial residual stress for a plurality hardened regions 111 from a plurality of pins 100 such that a hoop and/or axial residual stress profile is obtained (e.g., see FIGS. 4A and 4B). The method also includes obtaining BN responses for the corresponding plurality of unhardened regions 114 from the plurality of pins 100 from which the XRD hoop and/or axial residual stress was obtained. It should be understood that the BN responses for the unhardened regions 114 are proportional to the XRD hoop and/or axial residual stress for the hardened regions 111 (e.g., see FIGS. 4A and 4B). Accordingly, a correlation between the BN responses for the unhardened regions 114 and the XRD hoop and/or axial residual stress for the hardened regions 111 may be provided and used to estimate the residual stress in hardened regions 111 not subjected to XRD residual stress measurement. For example, after the correlation between the residual stress and the BN response has been determined for the pin journal surface 110, a BN response from an unhardened region 114 of a pin 100 not analyzed via XRD may be used to estimate the residual stress in the hardened region 111 surrounding the unhardened region 114.

Referring now to FIG. 6, in one form of the present disclosure, a method 40 for determining residual stress in a selectively hardened part comprising an unhardened region adjacent to a hardened region is provided. The method 40 includes obtaining a BN response from an unhardened region of the selectively hardened part at step 42. In some aspects of the present disclosure, the BN response is obtained by scanning the unhardened region of a selectively hardened part with a BN scanner. One non-limiting example of a BN scanner is a CrankScan 1000 BN Scanner sold by American Stress Technologies located in Pittsburgh, Pa. After the BN response is obtained at step 42, a residual stress value for the hardened region is selected (e.g., using a plot as in FIGS. 4A and/or 4B). As described above, the selected residual stress value accurately estimates the actual residual stress as measured via XRD for the hardened region of the selectively hardened part.

Referring now to FIG. 7, in another form of the present disclosure, a method 50 for determining residual stress in a selectively hardened part comprising an unhardened region adjacent to a hardened region is provided. The method 50 includes creating a look-up table comprising hoop and/or axial residual stress values and BN responses from a plurality of selectively hardened parts at step 52. The look-up table may be created by obtaining XRD hoop and/or axial residual stresses and BN responses for a plurality of selectively hardened parts as described above such that an XRD hoop and/or axial residual stress profile and a corresponding BVN response profile are provided. At step 54 an unhardened region of a selectively hardened part is BN scanned and a BN response value is obtained. At step 56 a corresponding residual stress value is selected from the look-up table. It should be understood that the selected residual stress value accurately estimates the residual stress in the hardened region of the selectively hardened part.

Referring now to FIG. 8, in yet another form of the present disclosure, a system 60 for measuring residual stress is provided. The system 60 comprises a BN scanning system 62 with a BN transmitter/receiver 64 configured to scan an unhardened region of a selectively hardened part (e.g., a pin 100 of a crankshaft 30) and obtain a BN response for the unhardened region. As schematically depicted in FIG. 8, the BN scanning system 62 includes one or more controls 63, switches, etc., such that the BN transmitter/receiver 64 moves in the x- and y-directions and BN scans various portions of the selectively hardened part. Also, it should be understood that the BN scanning system is operable to rotate the selectively hardened part about the x-axis shown in the figure. The BN transmitter/receiver 64 is in communication with a microprocessor 66 and the microprocessor 66 is in communication with a look-up table 68. The look-up table 68 that has a plurality of hoop and/or axial residual stress values from a plurality of hardened regions of a plurality of selectively hardened parts and a plurality of BN responses from a plurality of unhardened regions of the plurality of selectively hardened parts may be included.

Still referring to FIG. 8, the BN scanning system 60 BN scans an unhardened region of the selectively hardened part and obtains a BN response from the unhardened region. The microprocessor 66 receives the BN response and selects a corresponding residual stress value from the look-up table 68 and provides the selected residual stress value to a user. The selected residual stress value accurately estimates the residual stress in a hardened region that is adjacent to the unhardened region of the selectively hardened part. It should be understood that the microprocessor 66 and the look-up table 68 may be included in a computer 69 which may or may not be part of the BN scanning system 62. That is, the computer 69 may be a separate component from the BN scanning system 62 and may include a software program 70 with instructions that result in a comparison of the BN response from an unhardened region to values in the look-up table 68 and providing a corresponding residual stress value from the look-up table 68 to a user.

While FIG. 8 schematically depicts a crankshaft 30 being BN scanned with the BN scanning system 62, it should be understood that BN scanning systems that BN scan parts with flat surfaces comprising an unhardened region adjacent and/or surrounded by a hardened region are included in the teachings of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for determining residual stress in a selectively hardened part comprising an unhardened region adjacent to a hardened region, the method comprising:
    obtaining a Barkhausen Noise (BN) value for the unhardened region; and
    selecting an X-ray diffraction (XRD) residual stress value as a function of the BN value from a look-up table, wherein the selected XRD residual stress value accurately estimates the residual stress in the hardened region of the selectively hardened part.

2. The method of claim 1, wherein the unhardened region is surrounded by the hardened region.

3. The method of claim 1, wherein the hardened region is a laser hardened region and the unhardened region is not laser hardened.

4. The method of claim 3, wherein the laser hardened region is in a compressive stress state and the unhardened region is in a neutral stress state, a tensile stress state or a combination of a neutral stress state and a tensile stress state.

5. The method of claim 3, wherein the laser hardened region is in a first stress state and the unhardened region is in a second stress state that is more positive than the first stress state.

6. The method of claim 3, wherein the laser hardened region comprises a first hardness and the unhardened region comprises a second hardness that is less than the first hardness.

7. The method of claim 1, wherein the selectively hardened part is selected from the group consisting of a crankshaft, a camshaft, and a gear.

8. The method of claim 1, wherein the selectively hardened part is a crankshaft, a pin journal surface of the crankshaft comprises the hardened region, and the unhardened region surrounds a pin oil hole within the pin journal surface.

9. The method of claim 8, wherein the pin journal surface is laser hardened except for the unhardened region surrounding the pin oil hole.

10. The method of claim 9, wherein the laser hardened pin journal surface comprises a martensitic microstructure and the unhardened region surrounding the pin oil hole comprises a ferritic microstructure.

11. The method of claim 1, wherein the look-up table comprises a plurality of XRD residual stress values for a plurality of hardened regions within a plurality of selectively hardened parts and a plurality of BN values for a plurality of unhardened regions within the plurality of selectively hardened parts, wherein the plurality of XRD residual stress values and the plurality of BN values each obey a linear relationship.

12. A method of determining residual stress of a hardened region in a selectively hardened part, the method comprising:
creating a look-up table comprising X-ray diffraction (XRD) residual stress values and Barkhausen Noise (BN) values from a plurality of selectively hardened parts, wherein:
the XRD residual stress values correspond to XRD residual stress measurements of a plurality of hardened regions from the plurality of selectively hardened parts with a range of compressive residual stresses and the BN values correspond to BN responses of a plurality of unhardened regions from the plurality of selectively hardened parts with a range of neutral and tensile residual stresses;
the unhardened region of each of the plurality of selectively hardened parts is adjacent the hardened region such that a residual stress of the unhardened region is a function of a residual stress of the hardened region;
scanning an unhardened region of the selectively hardened part with a BN scanner and obtaining a BN response; and
selecting an XRD residual stress value from the look-up table corresponding to the BN response, wherein the selected XRD residual stress value accurately estimates the residual stress in the hardened region of the selectively hardened part.

13. The method of claim 12, wherein the unhardened region is surrounded by the hardened region.

14. The method of claim 12, wherein the hardened region is a laser hardened region and the unhardened region is a not laser hardened.

15. The method of claim 12, wherein the selectively hardened part is selected from the group consisting of a crankshaft, a camshaft, and a gear.

16. The method of claim 12, wherein the selectively hardened part is a crankshaft, the hardened region is a pin journal surface and the unhardened region is a pin oil hole.

17. A residual stress measurement system comprising:
a Barkhausen Noise (BN) scanning system configured to scan an unhardened region of a selectively hardened part and obtain a BN value for the unhardened region;
a look-up table comprising a plurality of BN values for a plurality of unhardened regions with a range of residual stresses for a plurality of selectively hardened parts and a plurality of X-ray diffraction (XRD) residual stress values for a plurality of hardened regions with a range of residual stresses from the plurality of selectively hardened parts, wherein the unhardened region of each of the plurality of selectively hardened parts is adjacent to the hardened region such that a residual stress of the unhardened region is a function of a residual stress of the hardened region; and
a microprocessor configured to receive the BN value for the unhardened region of the selectively hardened part from the BN scanning system and select an XRD residual stress value as a function of the BN value from the look-up table, wherein the selected XRD residual stress value accurately estimates a residual stress of a hardened region of the selectively hardened part.

18. The system of claim 17, wherein the BN values in the look-up table are from a plurality of unhardened regions surrounded by the plurality of hardened regions such that each unhardened region is surrounded by a hardened region.

19. The system of claim 17, wherein the BN values and the XRD residual stress values each obey a linear relationship.

20. The system of claim 17, wherein the selectively hardened part is selected from the group consisting of a crankshaft, a camshaft, and a gear.

\* \* \* \* \*